(No Model.) 2 Sheets—Sheet 1.
O. GASSETT.
THERMOSTATIC PRESSURE REGULATOR.
No. 510,017. Patented Dec. 5, 1893.
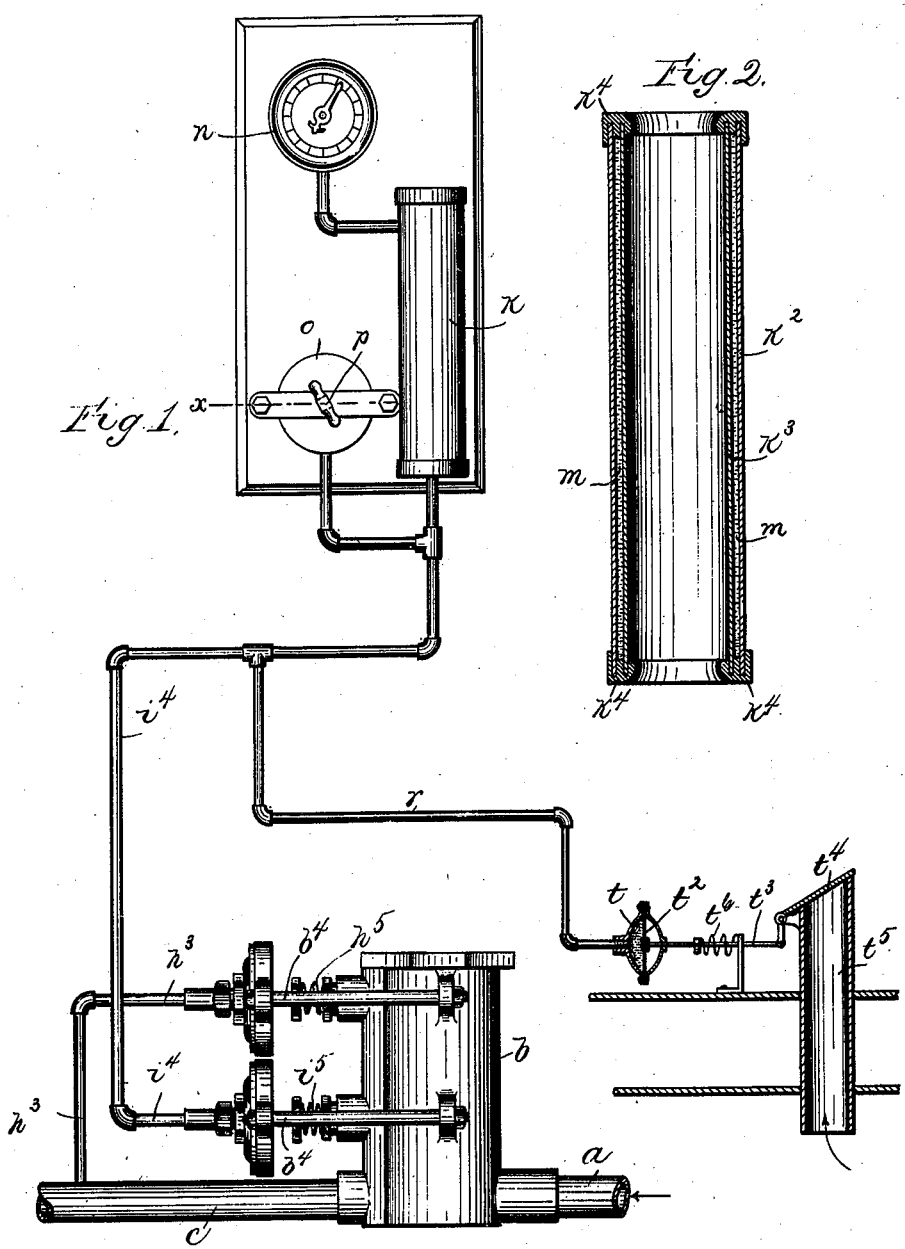
Witnesses
Jas. J. Maloney
M. E. Hill
Inventor.
Oscar Gassett,
by Jno. P. Livermore
Att'y.

(No Model.) 2 Sheets—Sheet 2.

O. GASSETT.
THERMOSTATIC PRESSURE REGULATOR.

No. 510,017. Patented Dec. 5, 1893.

Witnesses
Jas. J. Maloney.
M. E. Hill.

Inventor.
Oscar Gassett,
by Jno. P. Livinne
Att'y.

UNITED STATES PATENT OFFICE.

OSCAR GASSETT, OF BOSTON, MASSACHUSETTS, ASSIGNOR TO THE CROSBY STEAM GAGE AND VALVE COMPANY, OF SAME PLACE.

THERMOSTATIC PRESSURE-REGULATOR.

SPECIFICATION forming part of Letters Patent No. 510,017, dated December 5, 1893.

Application filed May 31, 1892. Serial No. 434,841. (No model.)

*To all whom it may concern:*

Be it known that I, OSCAR GASSETT, of Boston, county of Suffolk, and State of Massachusetts, have invented an Improvement in Thermostatic Pressure-Regulators, of which the following description, in connection with the accompanying drawings, is a specification, like letters on the drawings representing like parts.

My invention relates to a thermostatic pressure regulator and is shown as employed in connection with steam heating pipes to automatically govern the admission of steam from a supply pipe to a radiator pipe, in which the heating effect of the steam is mainly produced.

The thermostat by which the heating apparatus is made responsive to changes in temperature produced by it, may be of any suitable kind being shown as a hollow tubular chamber containing a fluid which expands and contracts in accordance with the changes in temperature to which its containing chamber is subjected, said chamber being formed in the space between two concentric tubes connected by an annulus at each end so as to form an annular chamber, the inner and outer walls of which are both exposed to the surrounding air so that the contained fluid is caused to respond very quickly to changes in temperature.

The expansion and contraction of the fluid in the thermostat are shown as employed to operate a secondary or controlling valve, which in turn governs the operation of a main valve by which steam is introduced from the supply pipe to the radiator pipe or heating system, the said parts all co-operating in such manner that when the temperature in the apartment being heated rises to a predetermined maximum amount, the thermostat causes the main valve to be closed, thus shutting off further supply of steam, until the temperature falls below the predetermined maximum, when the valve is again caused to open and afford a further supply of steam to the heating apparatus.

Figure 3:
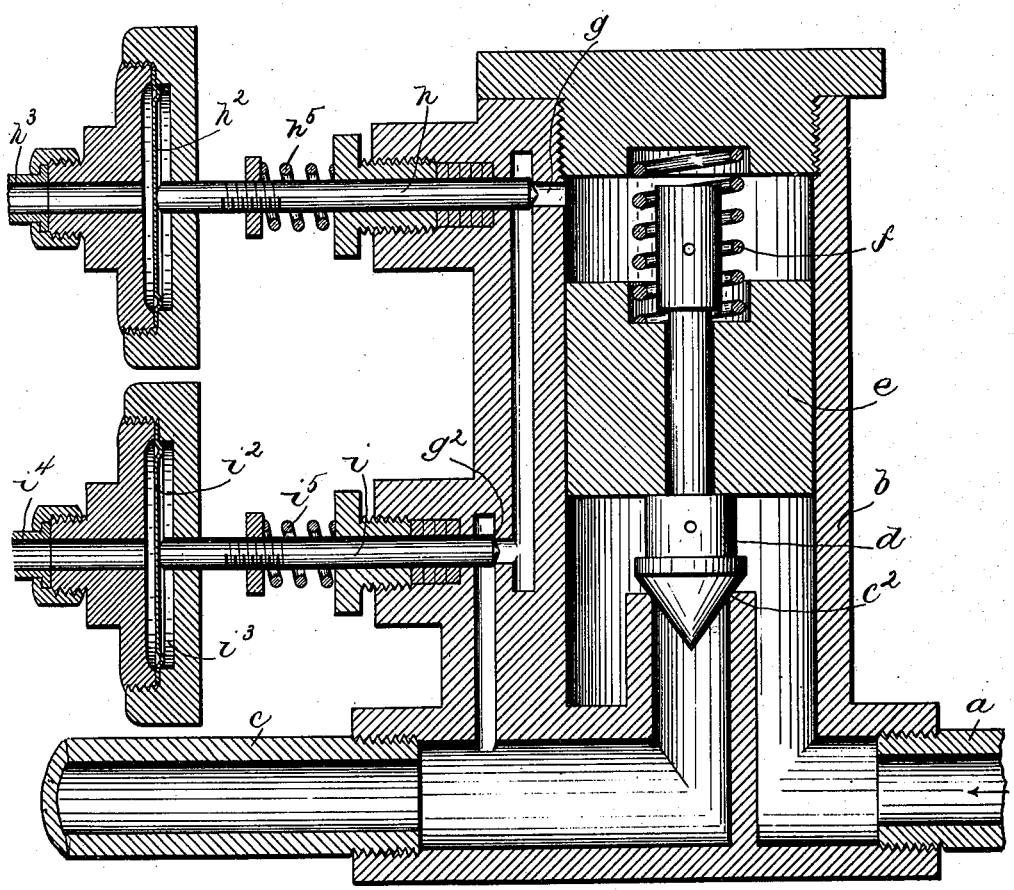

Figure 1 is a side elevation of a thermostatic regulating apparatus embodying this invention; Fig. 2 a longitudinal section of the thermostat detached; Fig. 3 a longitudinal section of the valve controlled by the thermostat, and Fig. 4 a section on line $x$ Fig. 1, of the thermostat adjusting device.

The apparatus is shown in this instance as intended to control the flow of steam from a supply pipe $a$, through a valve chamber $b$ into the heating pipe $c$ that connects with, or forms a part of the radiator or pipes in which the steam is used for heating. The said valve shell $b$ is in the form of a cylinder into one end of which the supply pipe $a$ opens directly as shown in Fig. 3, while the delivery pipe $c$ terminates in a valve seat $c^2$ contained in said cylinder and governed by a main valve $d$ which is connected with a piston $e$ having a loose fit in the said cylinder or there being otherwise provided a passage for the fluid to leak past the piston into the other end of the cylinder said leak passage being of small capacity relative to the exhaust passage from the other end of the cylinder which will be hereinafter described. The face of the piston next the valve is thus always acted upon by the pressure of the steam from the supply pipe $a$ but owing to the loose fit or leakage past the piston the said steam tends to pass by the piston and fill the other end of the cylinder so as to produce an equal pressure at the other end of the piston which thus becomes balanced so far as the pressures are concerned, and is acted upon by a spring $f$ which tends to move and hold the valve $d$ to its seat when the pressure is thus balanced on the piston. The upper part of the cylinder, that is the part on the side of the piston $e$ remote from the valve is provided with an outlet or exhaust passage $g$ of such capacity relative to the leak past the piston that, if said outlet passage is unobstructed the escape of the steam therethrough will relieve the pressure above the piston, thus leaving the pressure on the valve side of the piston substantially unbalanced, so that it will overcome the spring $f$ and open the main valve and permit the steam to pass into the radiator pipe $c$. The said passage $g$ is controlled by a pressure regulating valve $h$ acted upon by a piston or diaphragm $h^2$ which is subjected to the pressure in the radiator pipe $c$ with which the diaphragm chamber is connected by a suitable pipe $h^3$. Thus when the pressure in the radiator pipe rises to a predetermined amount it acts on the diaphragm $h^2$ closes the valve $h$ and thus obstructs the passage $g$ so that the pressure is no longer relieved in the upper part of the cylinder and the main valve $d$ consequently closes. The device thus far described therefore, acts as a pressure regulator which prevents the pressure from rising above the predetermined amount in the radiator pipe. The admission of steam to the radiator pipe is controlled in accordance with the changes in temperature produced by it, as follows:—The continuation of the passage $g$ beyond the valve $h$ is provided with a valve seat at $g^2$ controlled by another valve $i$ which may be called a thermal valve, as it is intended to be operated in accordance with changes in temperature in the apartment heated by the radiator. The said valve $i$ is operated by a diaphragm $i^2$ in a diaphragm chamber $i^3$ communicating by a pipe $i^4$ with the thermostat $k$ which as shown in this instance is an annular chamber formed between two concentric tubes $k^2$, $k^3$, see Fig. 2, connected at their ends by annular heads $k^4$, thus making an annular cylindrical space containing a liquid $m$ of such nature as to have considerable expansion and contraction as its temperature rises and falls. The pipe $i^4$ opens into the said chamber and the said pipe and the diaphragm chamber $i^3$ are preferably filled with a liquid or other means for transmitting fluid pressure from the thermostat to the diaphragm chamber, which transmitting means are only slightly affected by changes in temperature, so that the apparatus responds mainly to the changes in temperature at the thermostat $k$ which may be placed in any desired position in the apartment to be heated.

Figure 4:
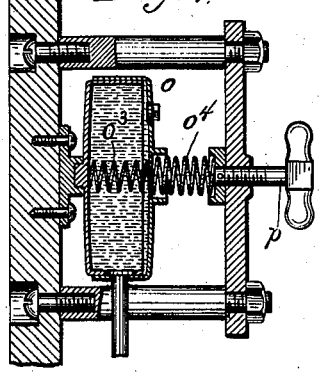

A suitable liquid for transmitting the pressure from the thermostat is a mixture of glycerine and water. The said thermostat is shown as also communicating with a pressure gage $n$ and with a pressure adjuster $o$ which may be a diaphragm chamber, the wall of which is controlled by an adjusting screw $p$ see Fig. 4, so as to force more or less fluid from it into the thermostat chamber $k$ to thus adjust the pressure therein independently of the variations produced by the changes in temperature. The adjuster $o$ is shown as composed of two flanged disks the flanges of which are overlapped and soldered together as shown in Fig. 4, thus making a flat chamber the disk walls of which are sufficiently flexible to produce variations in the capacity of said chamber by springing the said walls outward and inward. An inclosed spring $o^3$ tends to spring the said walls outward and increase the capacity of the chamber and a stiffer spring $o^4$ is interposed between the adjusting screw $p$ and the adjacent wall of the chamber. Thus by turning the screw $p$ inward the chamber is correspondingly collapsed and a portion of the fluid expelled therefrom so that a less amount of expansion of the fluid $m$ in the thermostat is required to cause the valve $i$ to close while turning the screw $p$ outward produces the opposite effect. The spring $o^4$ is of such stiffness that normally it constitutes practically a rigid or invariable extension of the screw $p$ but the said spring yields when the chamber $o$ is exposed to internal pressure of abnormal amount and thus tends to relieve the pressure produced by the liquid in the thermostat, if it should increase too rapidly owing to slowness in response of the temperature to the shutting off of steam from the radiator. That is, the temperature might continue to rise after it has expanded the fluid $m$ sufficiently to close the valve $i$ as the steam in the radiator might continue to give out heat although further supply of steam was shut off. Under such circumstances, if the space containing the fluid $m$ and the fluid by which the pressure is transmitted to the diaphragm $i^2$ were substantially invariable except as the said diaphragm $i^2$ is capable of yielding, the apparatus might be strained, but if a further expansion of the fluid should occur under these circumstances the expansibility of the chamber $o$ permitted by the spring $o^4$ would be sufficient to accommodate it without straining the apparatus and as soon as the cause for the abnormal expansion was removed, the said chamber $o$ would return to its normal condition under the action of the spring $o^4$. Thus the thermostat may be adjusted to act at any desired temperature so as to operate the valve $i$; a slight rise above the predetermined amount completely closing the said valve, and a slight fall opening the same. Normally, if the apartment to be heated is below the desired normal temperature, the valve $i$ would remain open and the main valve will then be controlled by the pressure regulating valve $h$ which will operate to admit steam to the radiator until it has the desired maximum pressure therein, and will so control the main valve as to keep the pressure in the radiator up to the desired maximum. If, however, the temperature in the apartment rises above the predetermined normal the thermal valve $i$ will close so that whatever may be the condition of the valve $h$ the outlet from the main valve cylinder will be closed and consequently the pressure at opposite ends of the main valve operating piston $e$ will become equalized and the main valve will be closed thus preventing further admission of steam until the temperature again falls below the normal when the valve $i$ will again be opened and the main valve again caused to admit steam under control of the pressure regulating valve $h$.

The pressure gage $n$ serves as an indicator to the operator in adjusting the action of the thermostat by the adjusting screw $e$, and also indicates the rise and fall of the temperature after the adjustment has been made. The invention is not limited to the specific form of thermostat shown as that of itself constitutes no part of the invention and it is obvious that the adjusting device shown in Fig. 4, might be used with any form of thermostat which depended upon the contraction and expansion of a confined fluid for its action.

The invention so far as relates to the thermostatic instrument and means for adjusting the action of the same is not limited to the specific form of valve apparatus operated by it and as shown in Fig. 1 anothe transmitting pipe $r$ connects the thermostat $k$ with a diaphragm chamber $t$ in which the fluid from the pipe $r$ acts upon a diaphragm $t^2$ the stem $t^3$ of which is connected with a valve or shutter $t^4$ controlling a ventilating pipe $t^5$ through which air from the external atmosphere may be introduced into the apartment containing the heating apparatus. A spring $t^6$ is applied to resist the pressure of the liquid on the diaphragm $t^2$ and is preferably so adjusted as to hold the said diaphragm from movement until after the expansion of the liquid in the thermostat $k$ has been sufficient to close the thermostatic controlling valve $i$. In this manner when the temperature in the apartment rises to the predetermined maximum the expansion of the liquid in the thermostat causes the valve $i$ to close and thus shuts off the steam or heating material from the heating apparatus but if owing to the steam that remains in the said apparatus after the admission is shut off, the temperature in the apartment should rise farther, the additional expansion of the liquid in the thermostat will cause the shutter $t^4$ to open and thus admit cool air to the apartment and as soon as the temperature begins to fall in response to the admission of the cool air and shut-off of the steam, the consequent contraction of the liquid in the thermostat will first permit the shutter $t^4$ to close and will finally cause the main steam valve to open and again begin to provide heat for the apartment.

The invention so far as it relates to the main valve and the secondary pressure-operated and thermal-operated controlling valves, is not limited to the specific construction of the thermostat employed, as it is obvious that the said construction can be varied widely while retaining substantially the same mode of operation in actuating the thermal controlling valve $i$.

The diaphragm chambers for the diaphragms $h^2$, and $i^2$, are made separate from the main valve cylinder $b$ but are connected therewith by suitable rods or bars $b^4$, see Fig. 1, so that the diaphragms although wholly unaffected by the pressure of the fluid in the main valve chamber $b$ and its ports operate effectively to move the valves $h$ and $i$ with relation to their seats in the outlet port $g$. Springs $h^5$ and $i^3$ press the valves toward the diaphragms and thus cause the valves to open when the diaphragms are permitted to recede by the diminution in the pressure in the diaphragm chamber. This construction is more effective than when the diaphragm chamber is a part of the main valve shell and the pressure is admitted to act upon it through ports formed in the main valve shell as in such construction leakage is likely to take place which may cause an abnormal pressure to come upon the diaphragms so as to interfere with their proper operation and consequently with the proper response of the main valve.

The employment of a substantially non expansible or a slightly expansible liquid to transmit the action of the thermostatic instrument, as it responds to the changes in temperature, to the valve apparatus that governs the supply of heat is important, because if a fluid highly sensitive to changes in temperature such as is desired in the thermostatic instrument were employed to transmit the action of the latter to the valve apparatus, the said fluid in the connecting pipes and especially in the diaphragm chamber adjacent to the valve would be exposed to the changes in temperature of the valve and affected thereby thus rendering it difficult to properly adjust the apparatus.

The apparatus has been spoken of as a steam heating apparatus. By that term it is intended to include any apparatus in which the heat is transmitted by a fluid such for example as steam or hot water, the flow of which and consequent supply of heat may be controlled by valves.

I claim—

1. The combination of the supply pipe and receiving pipe of a radiator of a steam heating system, with a cylindrical valve shell and valve therein, and an actuating piston for said valve constantly exposed at one end to the pressure from the supply pipe, which is also slowly admitted through a relatively small passage to act at the other end of said piston; a relatively large exhaust passage from the end of the cylinder remote from the steam inlet, and pressure responsive and thermal responsive valves, controlling the said exhaust passage, substantially as described.

2. A thermostatic instrument composed of a chamber containing a fluid responsive by expansion and contraction to changes in temperature, and a flexible walled adjusting chamber containing a fluid communicating with that in the thermostat, a spring contained in said chamber and tending to expand the walls thereof, and an adjusting screw and spring interposed between the same and the outer surface of the wall of said chamber, substantially as and for the purpose described.

3. The cylindrical valve shell and valve therein, and an actuating piston for said valve constantly exposed at one end to the pressure from the supply pipe to the valve said pressure being permitted to leak past the said piston, through a relatively small passage, a relatively large exhaust passage from the end of the valve cylinder remote from the inlet thereto; a secondary valve controlling the said exhaust port and a diaphragm chamber and diaphragm for actuating said secondary valve said diaphragm chamber being external to and wholly disconnected from the passages of said main valve but connected therewith by suitable supports, substantially as and for the purpose described.

In testimony whereof I have signed my name to this specification in the presence of two subscribing witnesses.

OSCAR GASSETT.

Witnesses:
 JOS. P. LIVERMORE,
 M. E. HILL.